No. 801,876. PATENTED OCT. 17, 1905.
M. B. HOLMES.
SOUNDING TOY.
APPLICATION FILED MAY 17, 1904.
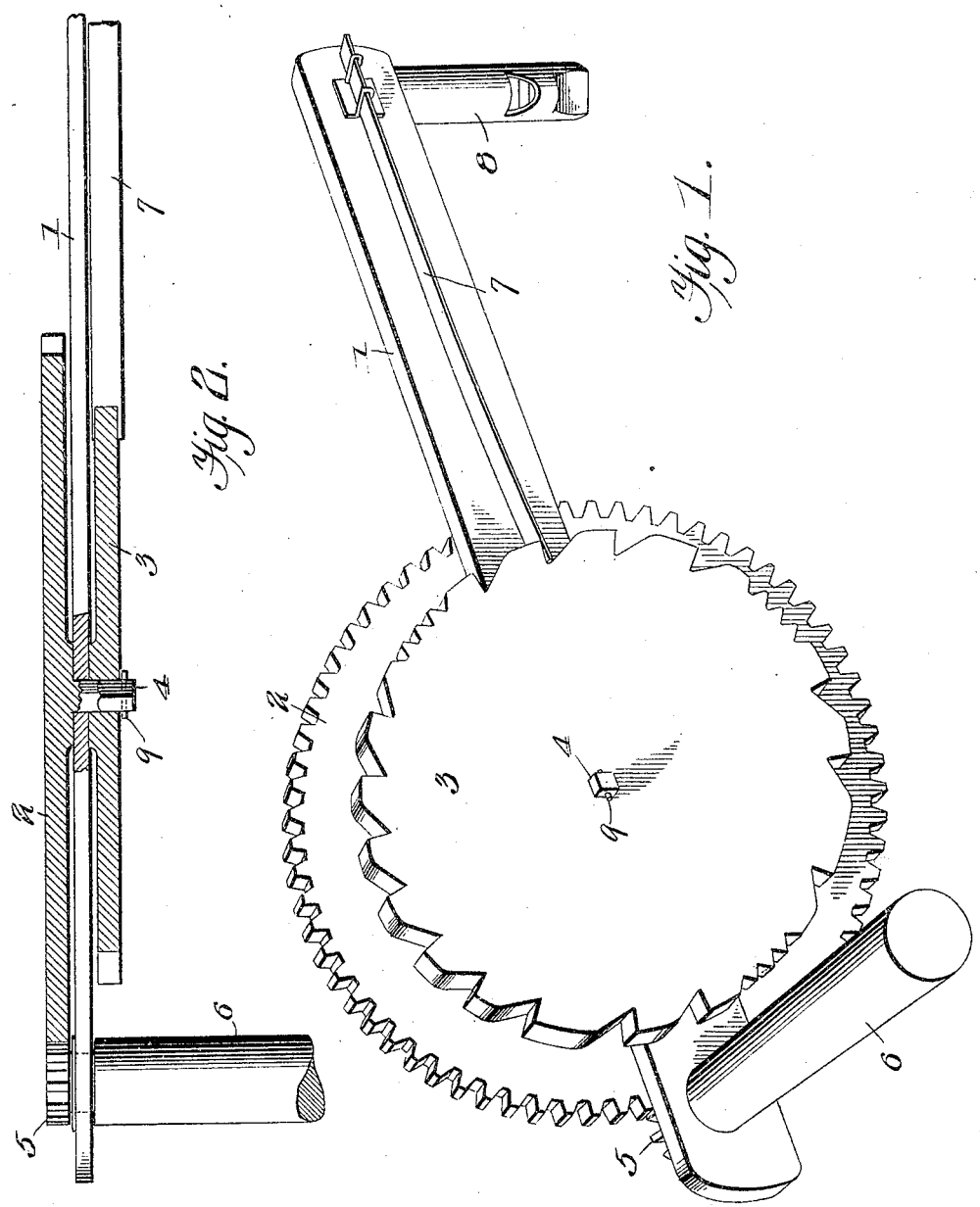
Witnesses
E. V. Stewart
W. H. Clarke
Milton B. Holmes,
Inventor.
by C. A. Snow & Co
Attorneys

UNITED STATES PATENT OFFICE.

MILTON BARCLAY HOLMES, OF WORCESTER, MASSACHUSETTS, ASSIGNOR OF ONE-HALF TO MYER KAUFMAN, OF WORCESTER, MASSACHUSETTS.

SOUNDING TOY.

No. 801,876.  Specification of Letters Patent.  Patented Oct. 17, 1905.

Application filed May 17, 1904. Serial No. 208,451.

*To all whom it may concern:*

Be it known that I, MILTON BARCLAY HOLMES, a citizen of the United States, residing at Worcester, in the county of Worcester and State of Massachusetts, have invented a new and useful Sounding Toy, of which the following is a specification.

This invention relates to sounding toys; and it has for its object to improve and simplify the construction of this class of devices and to provide a toy capable of producing rhythmical sounds.

With these ends in view the invention consists in the improved construction and novel arrangement and combination of parts, which will be hereinafter fully described, and particularly pointed out in the claims.

In the accompanying drawings has been illustrated a simple and preferred form of embodiment of the invention, it being, however, understood that no limitation is necessarily made to the precise structural details therein exhibited, but that the right is reserved to any changes, alterations, and modifications to which recourse may be had within the scope of the invention and without departing from the spirit or sacrificing the efficiency of the same.

In said drawings, Figure 1 is a perspective view of a device constructed in accordance with the principles of the invention. Fig. 2 is a side elevation, partly in section.

Corresponding parts in both the figures are indicated by like characters of reference.

In its preferred form the invention comprises a bar 1, upon which a pair of disks 2 3 are journaled upon an axle 4. The periphery of the disk 2 is formed with cogs or gear-teeth which are engaged by a pinion 5, mounted rigidly upon a handle 6, that passes loosely through the bar 1. Upon the latter at the end opposite to the handle 6 is mounted a spring 7 the end of which is in contact with the periphery of the disk 3. A fife-pitched whistle 8 is attached to the outer end of the bar 1. The disk 3 is preferably held upon an angular or non-circular portion of the axle 4 by means of a pin 9, so that it may be easily removed therefrom and replaced by another disk.

The disk 3 is formed at its periphery with a plurality of notches adapted to be successively engaged by the free end of the spring 7 and adapted to produce by contact with said spring a rattling sound somewhat resembling that of a snare-drum. By properly spacing the notches the sound is made rhythmical and may be made to imitate the drum accompaniment to various marches and other tunes. The disk 3 being readily detachable may be conveniently removed and exchanged for one having differently-disposed notches. The disk 3 may thus be described as constituting a "record," and a number of such records may be provided.

As will be clearly seen by reference to Fig. 1 of the drawings, the bar 1, which constitutes the body of the device, is elongated or extended beyond the edge of the gear-wheel 2 opposite to the edge of the gear-wheel adjacent to which the pinion-carrying handle 6 is applied to said bar. The whistle 8 is thus spaced from the axis of rotation and the weight of the whistle is thus utilized in enabling the bar carrying the gear-wheel and the toothed disk to be conveniently and effectively twirled or rotated. Thus by extending the bar and attaching the whistle near its outer end a twofold object is attained. First, the whistle will be caused to move through the air with sufficient rapidity to cause it to be sounded clearly and sharply, and, second, the weight of the whistle will be utilized to enable the bar to be twirled rapidly and in enabling the friction between the spring 7 and the periphery of the toothed disk to be readily overcome. Apart from its office of producing a sound to accompany the sound produced by the rattle it will thus be seen that the said whistle exercises the distinctly mechanical function of a weight to enable the device to be conveniently operated.

It will be understood that the device is operated by grasping the handle 6 and twirling it, so that the bar 1 will revolve upon the handle. The pinion 5 will thus cause the disks 2 and 3 to revolve, while the free end of the spring 7 will slip over the notched periphery of the disk. At the same time the twirling motion of the bar causes the whistle to be blown.

Having thus described the invention, what is claimed is—

1. A sounding toy including a rattle having an extended bar mounted for rotation upon a handle, means between the handle and the rattle for operating the latter, and a whistle, constituting a weight at the outer end of said bar.

2. In a sounding toy, a bar mounted for rotation upon a handle, a pinion upon said handle, a gear-wheel mounted for rotation upon the bar adjacent to the handle and meshing with the pinion, a disk connected with the gear-wheel, a spring attached to the bar and engaging the periphery of the disk, and a whistle connected with the outer end of said bar, at a distance from the gear-wheel, and constituting a weight to facilitate the twirling of the bar.

3. In a sounding toy, a bar mounted for rotation upon a handle, a pinion upon said handle, a gear-wheel connected for rotation with the bar by an axle having a non-circular portion, said gear-wheel meshing with the pinion, a disk mounted detachably upon the non-circular portion of the axle, means for retaining said disk in position, and a spring connected with the bar and engaging the periphery of the disk.

4. A toy for producing rhythmical sounds, the same including a twirling bar, a disk connected for rotation with said bar, means for rotating said disk by the twirling motion of the bar, a spring connected with the latter and impinging upon the periphery of the disk, and a fife-pitched whistle constituting a weight attached to said twirling bar near its extremity.

In testimony that I claim the foregoing as my own I have hereto affixed my signature in the presence of two witnesses.

MILTON BARCLAY HOLMES.

Witnesses:
VICTOR E. REMO,
CARRIE F. BROWN.